Aug. 29, 1939.　　C. J. THOMPSON　　2,171,260
EYEPIECE LIGHT FILTER FOR PHOTOMETERS
Filed July 23, 1938
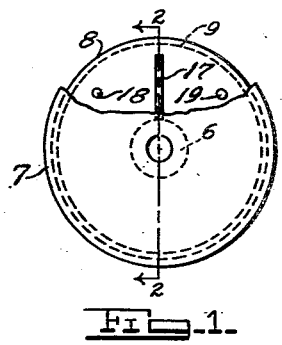
Fig. 1.
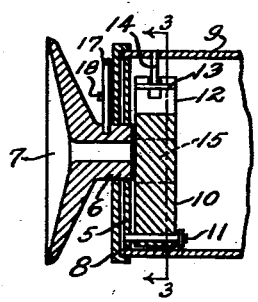
Fig. 2.
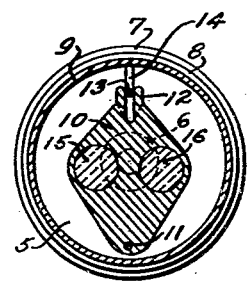
Fig. 3.
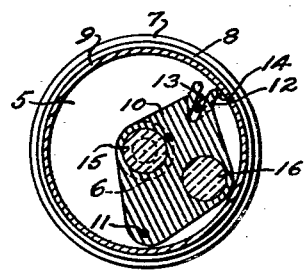
Fig. 4.
Inventor
C. J. THOMPSON
By
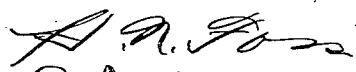
Attorneys Patented Aug. 29, 1939

2,171,260

UNITED STATES PATENT OFFICE 2,171,260

EYEPIECE LIGHT FILTER FOR PHOTOMETERS

Clifford J. Thompson, Washington, D. C.; dedicated to the free use of the People of the United States of America Application July 23, 1938, Serial No. 220,942

3 Claims. (Cl. 88—23)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes, without the payment to me of any royalty thereon.

I hereby dedicate the invention herein described to the free use of the people of the United States of America to take effect on the granting of a patent to me.

This invention relates to photometers and it is more particularly concerned with a device incorporated in the eyepiece of photometers for substituting color filters in the field of view.

One of the objects of this invention is the provision of a plurality of color filters mounted in the eyepiece of a photometer, any one of which can be selectively utilized by means of an exterior control.

In my co-pending application, filed contemporaneously herewith, entitled Light filter magazine for photometers, Serial No. 220,941, I have described a device whereby a great number of color filters can be selectively utilized. However, there are many instances where a small number of color filters are sufficient for use, and in this invention a slight rotation of the eyepiece aperture disc permits the selection of a color filter. One of the advantages of this invention is that it does not require redesigning of the eyepiece casing of the photometer and that it is adaptable for use with conventional equipment.

The invention is hereinafter described for the selective utilization of only two filters in view of the practical limitations imposed by the small diameter of the ordinary photometer eyepiece casing now commercially available. However, while this may be a practical limitation, it is not a theoretical limitation and it is obvious that more than two color filters may be employed where space permits it.

One of the outstanding advantages of this invention is its extreme simplicity and its ease and convenience of operation in addition to the fact that the substitution of one filter for another in the field of view is accomplished very rapidly.

The following description, considered together with the accompanying drawing, will disclose this invention more fully, its construction in operation of parts and further objects and advantages thereof will be apparent.

In the drawing:

Figure 1 is a front elevational view of an eye piece casing of a photometer with a part of the aperture disk broken away.

Figure 2 is a fragmentary cross-sectional view of Figure 1 along the line 2—2.

Figure 3 is a cross-sectional view along the line 3—3 showing the filter magazine in a neutral position.

Figure 4 is the same view as Figure 3 except that the magazine is shown displaced to one side to bring into the field of view one of the color filters.

Referring with more particularity to the drawing in which like numerals designate like parts, a disk 5 having a central aperture is secured to the extended hollow shaft 6 of the eyepiece aperture disk 7. Said shaft 6 is rotatably mounted in the front end plate 8 of the eyepiece casing 9. The color filter magazine 10 is of the general shape of a heart, as commonly illustrated, and its pointed end is pivoted to the disk 5 by means of a pin connection 11. The other end of the filter magazine terminates in the shape of a slotted stem 12 slidably engaged with an axially disposed pin 13 fixed to the casing wall by means of an arm 14. By rotating the eyepiece aperture disk 7 either to the right or left the disk 5 rotates and carries with it the pivoted end of the magazine 10 while the other end of the magazine is held substantially stationary by means of the slotted stem 12, which slotted stem also permits a shortening of the distance between the pin connection 11 and the pin 13. This rotation can be continued until one side of the magazine abuts the inner wall of the eyepiece casing. The color filters 15 and 16 are so disposed in the magazine that when the magazine is in either of its two extreme positions one of the filters comes fully within the field of view. Thus by simply rotating the eyepiece aperture 7 as far as it will go either to the right or to the left, the filters 15 and 16 can be brought into the field of view.

If desired this device may be modified by pivoting the pointed end of the magazine to the casing wall instead of to the disk 5 and mounting the pin 13 on the disk 5 instead of to the casing wall. The relative movements of the magazine in this modified form are substantially the same as in the illustrated form.

To prevent damage to the device by virtue of careless manipulations of the aperture disk 7, an arm 17 may be radially attached to the shaft 6 on the outside of the eyepiece casing to abut studs 18 and 19 on the casing end piece 8. Said studs 18 and 19 are so spaced that when the arm 17 abuts either one of them, one of the filters is brought fully within the field of view.

Having thus described my invention, I claim:

1. A device of the character described housed by the eyepiece casing of a photometer, comprising a heart-shaped color filter magazine carrying a plurality of color filters, said magazine having its pointed end eccentrically pivoted to a disc, said disc being fixedly mounted on an extended shaft of the eyepiece aperture disc of said photometer, said eyepiece disc being rotatably mounted on said casing, the other end of said magazine terminating in a slotted stem slidably engaged with a pin, the slot being on a line directed toward the pivot, said pin being fixedly mounted to the eyepiece casing of the photometer.

2. In combination with the eyepiece casing of a photometer, an eyepiece disc rotatably mounted on said casing, another disc mounted within said casing for rotation with said eyepiece disc, a color filter magazine carrying a plurality of color filters within said casing, said magazine at one end being eccentrically pivoted to the said disc within the casing, the other end of said magazine having a slot on a line directed toward the pivot, and a pin fixed to said casing slidably engaged with said slot.

3. In combination with the eyepiece casing of a photometer, an eyepiece disc rotatably mounted on said casing, another disc mounted within said casing for rotation with said eyepiece disc, a color filter magazine carrying a plurality of color filters within said casing, said magazine at one end being eccentrically pivoted to the said disc within the casing, the other end of said magazine having a slot on a line directed toward the pivot, a pin fixed to said casing slidably engaged with said slot, and means for limiting the amount of rotation of said eyepiece disc.

CLIFFORD J. THOMPSON.